United States Patent
Veeramani et al.

(10) Patent No.: US 11,032,357 B2
(45) Date of Patent: Jun. 8, 2021

(54) DATA PROCESSING OFFLOAD

(71) Applicant: Intel Corporation, Santa Clara, CA (US)

(72) Inventors: Karthik Veeramani, Hillsboro, OR (US); Ujwal Paidipathi, Beaverton, OR (US); Rajneesh Chowdhury, Portland, OR (US); Prakash N. Iyer, Portland, OR (US); Maciej Machnikowski, Wejherowo (PL); Chris Pavlas, Hillsboro, OR (US); Scott P. Dubal, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 417 days.

(21) Appl. No.: 15/474,587

(22) Filed: Mar. 30, 2017

(65) Prior Publication Data

US 2018/0288137 A1    Oct. 4, 2018

(51) Int. Cl.
*G06F 15/16*     (2006.01)
*H04L 29/08*     (2006.01)
*G06F 9/48*      (2006.01)

(52) U.S. Cl.
CPC ........ *H04L 67/1002* (2013.01); *G06F 9/4843* (2013.01); *H04L 67/10* (2013.01); *H04L 67/34* (2013.01); *H04L 67/141* (2013.01)

(58) Field of Classification Search
CPC ..... H04L 67/1002; H04L 67/10; H04L 67/34; H04L 67/141; G06F 9/4843
USPC ........................................................ 709/203
See application file for complete search history.

(56) References Cited

U.S. PATENT DOCUMENTS

| 2003/0088660 | A1 | 5/2003 | Florman et al. |
| 2007/0071034 | A1* | 3/2007 | Fleming ............. H04L 69/22 370/474 |
| 2007/0226226 | A1 | 9/2007 | Mintz |
| 2010/0272258 | A1* | 10/2010 | Sadovsky ........... H04L 67/10 380/255 |

(Continued)

FOREIGN PATENT DOCUMENTS

| WO | 96-03692 A1 | 8/1996 | |
| WO | WO-2017112866 A1 * | 6/2017 | .......... G06F 9/5027 |

OTHER PUBLICATIONS

International Search report and Written Opinion for International Patent Application No. PCT/US2018/025340, dated Jul. 18, 2018, 14 pages.

(Continued)

*Primary Examiner* — Imad Hussain
(74) *Attorney, Agent, or Firm* — Jordan IP Law, LLC

(57) ABSTRACT

Systems, apparatuses, and/or methods to provide data processing offload. An apparatus may determine whether a task is to be processed locally at a client device or remotely off the client device and issue the task to a wireless network and/or a wired network when the task is to be processed remotely off the client device at a server device. An apparatus may identify the task from the wireless network and/or the wired network when the task is to be processed locally at the server device, distribute the task to a server resource at the server device when the task is to be to processed locally at the service device, and provide a result of the task to the wireless network and/or the wired network when the result is to be consumed remotely at the client device.

12 Claims, 6 Drawing Sheets

(56) References Cited

U.S. PATENT DOCUMENTS

| | | | | |
|---|---|---|---|---|
| 2011/0191457 | A1* | 8/2011 | Nadesan | G06F 15/173 |
| | | | | 709/223 |
| 2011/0225298 | A1 | 9/2011 | Brown et al. | |
| 2011/0320520 | A1* | 12/2011 | Jain | G06F 9/5072 |
| | | | | 709/203 |
| 2012/0185569 | A1* | 7/2012 | Das | H04L 67/12 |
| | | | | 709/219 |
| 2012/0192243 | A1* | 7/2012 | Hall | H04N 21/43637 |
| | | | | 725/118 |
| 2012/0284719 | A1 | 11/2012 | Phan et al. | |
| 2014/0045485 | A1* | 2/2014 | Jain | H04W 52/0261 |
| | | | | 455/420 |
| 2014/0095695 | A1* | 4/2014 | Wang | G06F 9/5088 |
| | | | | 709/224 |
| 2014/0189389 | A1* | 7/2014 | Lynar | G06F 1/329 |
| | | | | 713/320 |
| 2015/0006620 | A1* | 1/2015 | Joseph | H04L 67/10 |
| | | | | 709/203 |
| 2015/0106823 | A1* | 4/2015 | Canoy | G06F 9/505 |
| | | | | 718/105 |
| 2016/0170849 | A1* | 6/2016 | Cheng | G06F 11/2025 |
| | | | | 714/11 |

OTHER PUBLICATIONS

International Preliminary Report on Patentability for International Patent Application No. PCT/US2018/025340, dated Oct. 10, 2019, 11 pages.

* cited by examiner

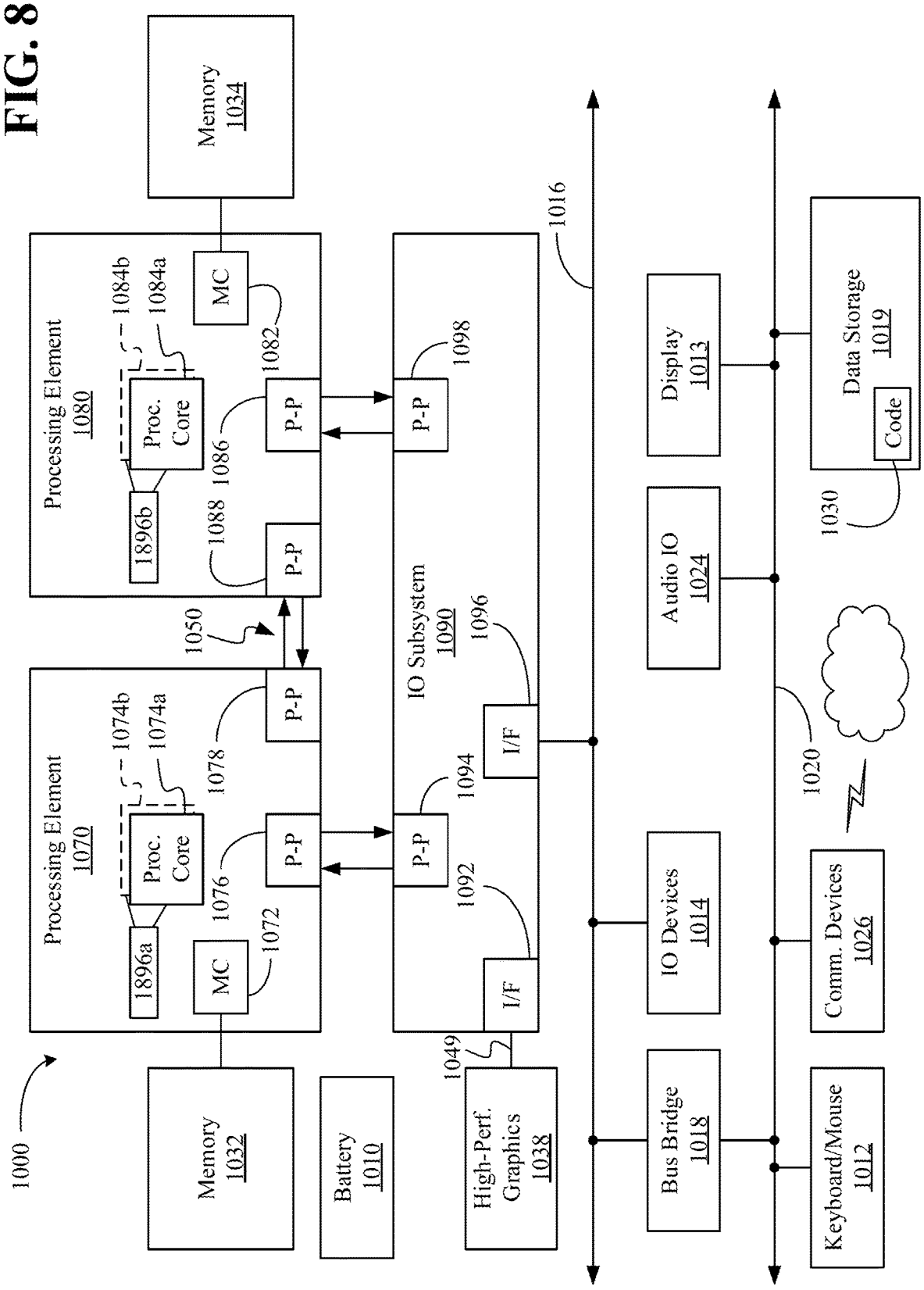

DATA PROCESSING OFFLOAD

TECHNICAL FIELD

Embodiments generally relate to data processing. More particularly, embodiments relate to offloading data processing from a client device to a server device.

BACKGROUND

A client device may not be preferred to process data. For example, a client device such as a phablet or a smartphone may have limited battery life that can drain relatively quickly when encoding video data. In addition, a client device may not have sufficient processing capabilities to process data. Wireless offload approaches may require an entire image of a client device to be copied and wirelessly forwarded to a computing platform, which may be relatively cumbersome and/or impractical. In addition, wireless offload approaches may apply to relatively low-bandwidth data such as voice commands and not to relatively moderate-bandwidth media data such as video data (e.g., high definition video, etc.). Unreliability and/or an inability to selectively wirelessly exchange data with a cloud server may also limit wireless approaches.

Wired offload approaches may connect a client device to a workstation using a wired connection, which may be relatively cumbersome and/or impractical for mobile implementations where a user prefers to move within an area (e.g., home environment, etc.). In this regard, a user may choose to use a workstation rather than a client device. Moreover, wired offload approaches from a smartphone or a workstation to a network server may use compression that may impact data quality such as image quality. In addition, a server may require one personal-computer-over-IP (PCoIP) module per remote client device for relatively high-bandwidth media data (e.g., 40 gigabits per second for 4K video, etc.), which may minimize efficiency, maximize cost, and/or require proprietary offloading solutions. Privacy may also be a concern for offloading data processing. For example, PCoIP solutions may not provide a relatively secure and/or efficient solution to push media data (e.g., video, etc.) to edge networks (e.g., fog). Thus, there is considerable room for improvement to provide data processing offload.

BRIEF DESCRIPTION OF THE DRAWINGS

The various advantages of the embodiments will become apparent to one skilled in the art by reading the following specification and appended claims, and by referencing the following drawings, in which:

FIG. 8 is a block diagram of an example of a computing system according to an embodiment.

DESCRIPTION OF EMBODIMENTS

Figure 1:
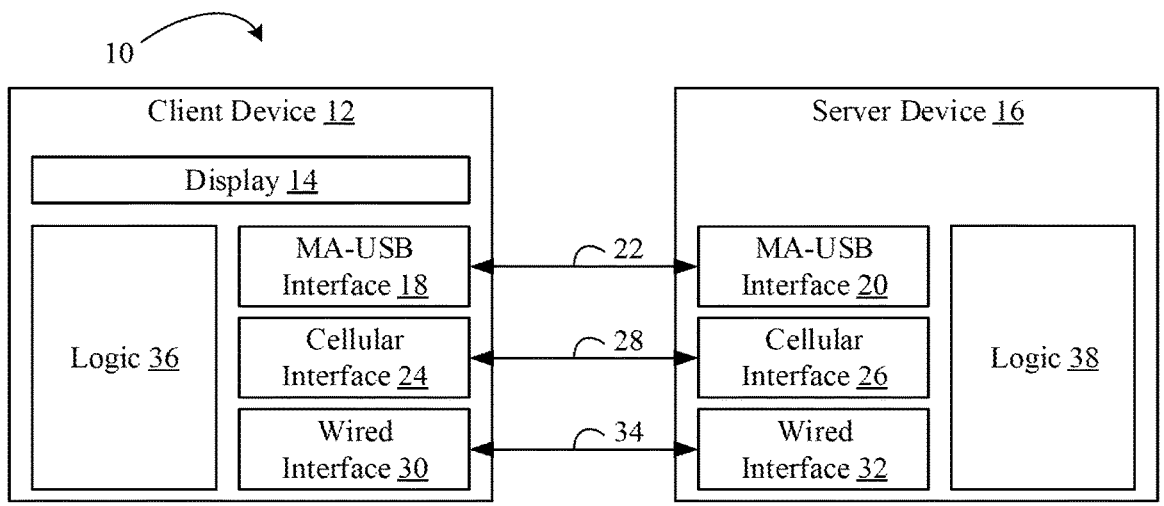
FIG. 1 is an illustration of an example of a system to provide data processing offload according to an embodiment.

Turning now to FIG. 1, a system 10 is shown to provide data processing offload according to an embodiment. As shown in FIG. 1, a client device 12 may be used to render relatively low-bandwidth data (e.g., an image, etc.), relatively moderate-bandwidth data (e.g., digital video, high definition video, etc.), relatively high-bandwidth data (e.g., 4K video, ultra-high definition video, etc.), and so on. In addition, the client device 12 includes a display 14 (e.g., liquid crystal display, transparent display, projection display, etc.) to present data such as an image (e.g., a map, etc.), a live television (TV) show, pre-recorded content (e.g., on demand TV show, movie, etc.), a video streamed from an online content provider, a video played from a storage medium, content with a virtual character, content with a real character, and so on.

The client device 12 may include, for example, a laptop, a personal digital assistant (PDA), a mobile Internet device (MID), a vehicle infotainment system, any smart device such as a wireless smart phone, a smart tablet (e.g., a phablet, etc.), a smart TV, a smart watch, smart glasses (e.g., augmented reality (AR) glasses, virtual reality (VR) glasses, etc.), a mobile gaming platform, and so on. The client device 12 may be coupled with a direct current power source (e.g., a battery power supply, etc.) to allow for a mobile implementation of the client device 12 by a user. Thus, a user may move in an area (e.g., a home, etc.) and render data (e.g., a video, etc.) without requiring a connection to an alternating current power source (e.g., a power outlet of a home, etc.).

The system 10 further includes a server device 16. The server device 16 may be coupled with an alternating current power source to allow for a stationary implementation of the server device 16 by a user. The server device 16 may include, for example, a personal computing platform such as a workstation (e.g., a Next Unit of Computing (NUC) device, an All-In-One Personal Computer, etc.), a media content player (e.g., a receiver, a set-top box, a media drive, etc.), a gaming platform, etc. The server device 16 may further include a cloud-computing device such as an endpoint server, a gateway server, a backbone server, an edge/fog server, etc. Notably, an edge server may bring bandwidth-intensive content and/or latency-sensitive applications closer to a user, wherein time-sensitive data may be analyzed at a network edge rather than being sent further into the cloud. Thus, the server device 16 may process data relatively quickly and/or send data to a cloud for processing, historical analysis, storage, etc.

The client device 12 and/or the server device 16 may include communication functionality for a wide variety of purposes such as, for example, cellular telephone (e.g., Wideband Code Division Multiple Access/W-CDMA (Universal Mobile Telecommunications System/UMTS), CDMA2000 (IS-856/IS-2000), etc.), Wireless Fidelity (WiFi, e.g., Institute of Electrical and Electronics Engineers/IEEE 802.11-2007, Wireless Local Area Network/LAN Medium Access Control (MAC) and Physical Layer (PHY) Specifications), Light Fidelity (LiFi, e.g., Institute of Electrical and Electronics Engineers/IEEE 802.15-7, Wireless Local Area Network/LAN Medium Access Control (MAC) and Physical Layer (PHY) Specifications), Long Term Evolution (e.g., 4G LTE, 5G LTE), Bluetooth (e.g., Institute of Electrical and Electronics Engineers/IEEE 802.15.1-2005, Wireless Personal Area Networks), World Interoperability for Microwave Access (WiMax, e.g., IEEE 802.16-2004, LAN/MAN Broadband Wireless LANS), Global Positioning System (GPS), spread spectrum (e.g., 900 MHz), Near Field Communication (NFC, ECMA-340, ISO/IEC 18092), Wireless Universal Serial Bus (e.g., Media Agnostic Universal Serial Bus (MA-USB), USB Implementers Forum v1.0), and/or other radio frequency (RF) purposes.

In the illustrated example, the client device 12 and the server device 16 include MA-USB interfaces 18, 20, respectively, to exchange data over a short-range wireless network 22. The MA-USB specification may support multiple communication types, including Wi-Fi operating in 2.4 Gigahertz (Ghz) and 5 Ghz, WiGig operating in 60 Ghz, WiMedia UWB radios operating between 3.1 Ghz and 10.6 Ghz, etc. The MA-USB specification may also be compliant with SuperSpeed USB (USB 3.1 and USB 3.0) and Hi-Speed USB (USB 2.0). Thus, the MA-USB interfaces 18, 20 may provide access to a MA-USB protocol stack and/or to the short-range wireless network 22. For example, the MA-USB interface 18 may provide access to a MA-USB host stack at the client device 12 and/or to the short-range wireless network 22, and the MA-USB interface 20 may provide access to a MA-USB hub stack at the server device 14 and/or to the short-range wireless network 22, and so on.

Accordingly, the client device 12 may include a smart device (e.g., a smart phone, a phablet, etc.) that is coupled with a battery power source to allow for a mobile implementation of the client device 12 in an area (e.g., a home, etc.). In addition, the server device 16 may include a personal computing platform (e.g., a workstation, etc.) that is powered by an alternating current power source to allow for a stationary implementation of the server device 16 in an area (e.g., home office, etc.). Processing of data (e.g., video, etc.) may be offloaded from the client device 12 to the server device 16 via the MA-USB interfaces 18, 20 over the short-range wireless network 22.

In the illustrated example, the client device 12 and the server device 16 further include cellular interfaces 24, 26, respectively, to exchange data over a cellular network 28. The cellular network 28 may include, for example, a 4G LTE network that may provide between 100 Megabits per second (Mbps) and 1 Gigabit per second (Gbps) network speed, a 5G LTE network that may provide between 1 Gbps and 10 Gbps network speed, and so on. The cellular interfaces 24, 26 may, therefore, provide access to a cellular wireless protocol stack and/or to the cellular network 28.

Accordingly, the client device 12 may include a smart device, a vehicle infotainment system, etc. In addition, the client device 12 may be coupled with a battery power source to allow for a mobile implementation of the client device 12 in an area (e.g., a road, etc.). Moreover, the server device 16 may include a cloud-computing device (e.g., an edge server, etc.) that is coupled with an alternating current power source to allow for a stationary implementation of the server device 16 in an area (e.g., a network operations center, etc.). Processing of data (e.g., image data, etc.) may be offloaded from the client device 12 to the server device 16 via the cellular interfaces 24, 26 over the cellular network 28.

In the illustrated example, the client device 12 and the server device 16 further include wired interfaces 30, 32, respectively, to exchange data over a wired network 34 (e.g., Ethernet network, fiber optic network, etc.). An Ethernet network may provide 100 Gbps network speed. In one example, the wired interface 32 at the server device 16 may include a remote direct memory access (RDMA) interface to allow a wired adapter to transfer data to and/or from server memory (e.g., random access memory, etc.) without requiring a processor (e.g., a central processing unit (CPU), etc.). The wired interfaces 30, 32 may, therefore, provide access to a wired protocol stack and/or to the wired network 34.

Accordingly, the client device 12 may include a laptop, a smart device, and so on. In addition, the client device 12 may be coupled with a battery power source to allow for a mobile implementation of the client device 12 in an area (e.g., a home, etc.). Moreover, the server device 16 may include a personal computing platform (e.g., a workstation, etc.), a cloud-computing device (e.g., an edge/fog server etc.), and so on. The server device 16 may be coupled with an alternating current power source to allow for a stationary implementation of the server device 16 in an area. Processing of data (e.g., video, etc.) may be offloaded from the client device 12 to the server device 16 via the wired interfaces 30, 32 over the wired network 34.

The system 10 further includes logic 36, 38 (e.g., logic instructions, configurable logic, fixed-functionality logic hardware, etc.) configured to implement any of the herein mentioned processes including, for example, processing data, etc. The logic 36 of the client device 12 may, for example, determine whether a task is to be processed locally at the client device 12 and/or remotely off the client device 12. The logic 36 may provide a task to a client resource when a task is to be processed locally at the client device 12. In addition, the logic 36 may provide a task to a wireless network (e.g., cellular network, WiFi network, etc.) and/or to a wired network (e.g., fiber optic network, etc.) when a task is to be processed remotely off the client device 12.

The logic 36 may determine, for example, that a type of data (e.g., video data, etc.) is to be offloaded over the short-range wireless network 22 and that another type of data (e.g., image data, etc.) is to be offloaded over the cellular network 28. The logic 36 may also determine that the client device 12 is to prefer the wired network 34 to the short-range wireless network 22 to offload a type of data. The logic 36 may consider, for example, an ability of a network to handle a task (e.g., network availability, network strength, network bandwidth, data bandwidth requirements, time of day, geographic location, server capabilities/availability, etc.), a preference (e.g., a wired network over a wireless network, a short-range wireless network over a cellular network, etc.), a selection (e.g., process image over a cellular network from a vehicle, etc.), and so on.

The logic 38 of the server device 16 may, for example, identify a task from a wireless network and/or a wired network when a task is to be processed locally at the server device 16. The logic 38 may provide a task to a server resource at the server device 16 when a task is to be processed locally at the server device 16. In addition, the logic 38 may provide a result of a task to a wireless network and/or a wired network when the result is to be consumed remotely. Thus, for example, the logic 38 may identify a task (e.g., encode video, generate a frame buffer, etc.), process a task to generate a result (e.g., encoded video, a frame buffer, a bitmap, object recognition data, etc.), compress a result, encrypt a result, provide a result to a wireless network and/or a wired network for consumption by the client device 16, and so on.

While examples have provided various components of the system 10 for illustration purposes, it should be understood that one or more components of the client device 12 and/or the server device 16 may reside in the same and/or different physical and/or virtual locations, may be combined, omitted, bypassed, re-arranged, and/or be utilized in any order. Moreover, any or all components of the client device 12 and/or the server device 16 may be automatically implemented (e.g., without human intervention).

Figure 2:
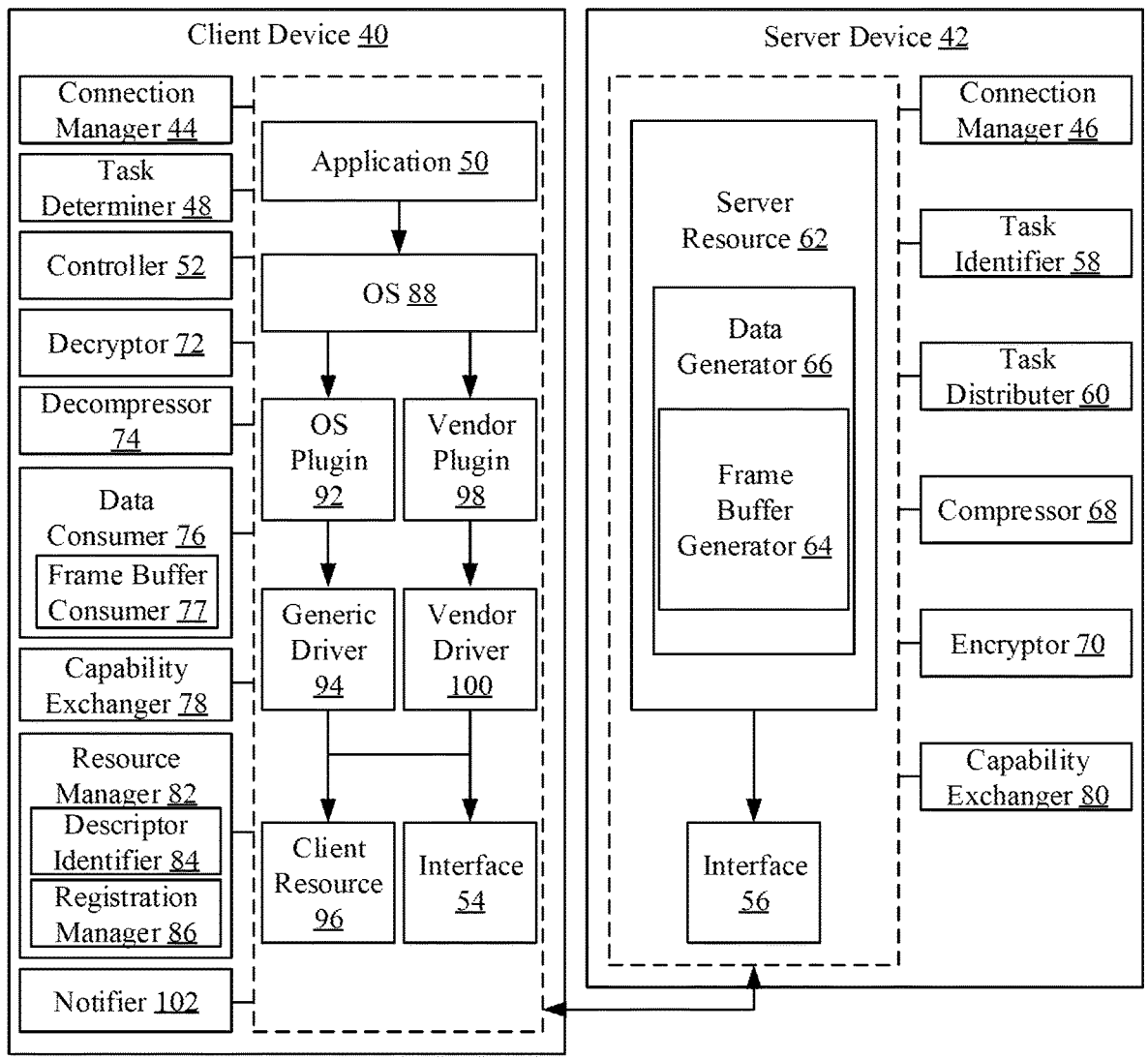
FIG. 2 is an illustration of an example of a client device and a server device to provide data processing offload according to an embodiment.

FIG. 2 shows a client device 40 and a server device 42 to provide data processing offload according to an embodiment. The client device 40 may include the same functionality as the client device 12 (FIG. 1), discussed above, and/or the server device 42 may include the same functionality as the server device 16 (FIG. 1), discussed above. Thus, for example, the client device 40 may include logic similar to the logic 36 (FIG. 1), discussed above, and/or the server device 42 may include logic similar to the logic 38 (FIG. 1), discussed above, to implement any of the herein mentioned processes.

In the illustrated example, the client device 40 includes a connection manager 44 to identify each network available to the client device 40 and/or to establish a connection over a network available to the client device 40. In addition, the server device 42 includes a connection manager 46 to identify each network available to the server device 42 and/or to establish a connection over a network available to the server device 42. The connection managers 44, 46 may, for example, determine proximity between the client device 40 and the server device 42 to establish a connection, determine signal strength of a wireless network between the client device 40 and the server device 42 to establish a connection, determine that the client device 40 and the server device 42 share a subnet to establish a connection, share keys, etc. The connection managers 44, 46 may make respective determinations periodically, ad-hoc in response to a request, and so on.

The client device 40 further includes a task determiner 48 to determine whether a task is to be processed locally at the client device 40 or remotely off the client device 40. The task determiner 48 may, for example, determine that a frame buffer requested by an application 50 is to be generated remotely off the client device 40. Thus, a controller 52 may issue a task (e.g., Video Graphics Accelerator (VGA) over Internet Protocol (IP), etc.) to the server device 42. The controller 52 may, for example, forward a task over a wired connection (e.g., an Ethernet network, etc.), over a wireless connection (e.g., a cellular network, etc.), and so on.

In the illustrated example, a task may be transmitted via an interface 54 at the client device 40 and received via an interface 56 at the server device 42. In this regard, a task identifier 58 at the server device 42 identifies a task from the client device 40 and a task distributer 60 distributes a task to a server resource 62 to handle a task (e.g., process a media task, etc.). The server resource 62 may include, for example, a codec, a VGA, a processor (e.g., to pattern match, pattern recognize, etc.), a video editor, etc. Thus, for example, the task identifier 58 may identify the VGA over IP task from the client device 40 and the task distributer 60 may distribute the VGA over IP task to a server VGA, wherein a frame buffer generator 64 of a data generator 66 may generate a frame buffer and transfer the frame buffer for storage (e.g., store at random access memory, etc.).

The server device 42 further includes a data compressor 68 to compress a result (e.g., a frame buffer, etc.) of task processing at the server device 62. The data compressor 68 may include a hardware data compressor. In one example, the data compressor 68 may implement Lempel-Ziv-Welch (LZW) lossless data compression. The server device 42 further includes a data encryptor 70 to encrypt a result task at the server device 62. The data encryptor 70 may include a hardware data encryptor. In one example, the data encryptor 70 may implement Advanced Encryption Standard (AES) (e.g., AES New Instruction (NI), etc.). Thus, an application specific integrated circuit (ASIC) such as an Intel® Quick Assist technology (QAT) chip may be implemented for security compression and acceleration to provide bulk cryptography (e.g., symmetric encryption and authentication, cipher operation, etc.), public key cryptography (e.g., asymmetric encryption, digital signatures, key exchanges, etc.), compression (e.g., lossless data compression, etc.) and so on.

The server device 42 may transfer a result of task processing to the client device 40 over a wired connection (e.g., an Ethernet network, etc.), over a wireless connection (e.g., a cellular network, etc.), and so on. In the illustrated example, a result may be transmitted via the interface 56 at the server device 42 and received via the interface 54 at the client device 40. For example, the interface 56 may include an RDMA interface to allow an adapter (e.g., Ethernet adapter, etc.) to transfer data to and/or from server memory without requiring a processor (e.g., a CPU, etc.). In this regard, relatively high-bandwidth data (e.g., 40 Gbps of data between clients, 4K data/images at 30 frames per second, etc.) may be processed via fully generated un-compressed or lossless decompressed frame buffers over Ethernet using RDMA.

Notably, hardware architecture of the server device 42 may act as a controller to render many frame buffers at once and securely send them to many remote clients simultaneously without requiring additional single use hardware such as a PCoIP module. In addition, data offload may be implemented for high quality medical imaging and/or for cloud graphic workstation solutions. For example, clients may better use their computing power and merge many workstations into one cloud-based solution. Also, latency from processing secure data (e.g., images, video, etc.) may be minimized. Moreover, lossless compression may minimize data artifacts (e.g., image artifacts, etc.).

Relatively secure and/or efficient approaches may also be provided to push data to edge networks (e.g., fog, etc.). For example, a meshed edge network may relatively quickly share data across an entire mesh to ensure relatively low latency fog communications. Processing may be offloaded to an edge itself utilizing platform features (e.g., field programmable gate arrays, QAT, etc.), and pushed through a cellular network (e.g., 4G, etc.) to mobile devices such as vehicles, smart phones, and so on. In one example, the server device 42 may relatively quickly share information about an accident throughout a mesh. Moreover, encryption may be implemented to ensure security of data (e.g., prevent modification, etc.). In addition, an infotainment system may need to see accident information, road signs, etc., wherein relatively small frame buffers from the server device 42 may be generated to be shown at a vehicle display.

In the illustrated example, the client device 40 further includes a data decryptor 72 to decrypt a result of task processing at the server device 42. The data decryptor 72 may include a hardware data decryptor. In one example, the data decryptor 72 may implement the reverse of AES (e.g., reverse of AES-NI, etc.). The client device 40 further includes a data decompressor 74 to decompress a result of task processing. The data decompressor 74 may include a hardware data decompressor. In one example, the data decompressor 74 may implement LZW lossless data decompression.

The client device 40 further includes a data consumer 76 to consume a result of task processing. In the illustrated example, the data consumer 76 includes a frame buffer consumer 77 that consumes a frame buffer. For example, the frame buffer consumer 77 may post a frame buffer from the server device 42 to a local VGA frame buffer that is read to present the frame buffer at a display (e.g., HD display, VR display, etc.) coupled with the client device 40. Thus, the client device 40 may decrypt and/or decompress (if needed) a frame buffer that is received and place the frame buffer into a relatively low-end graphic adapter that is substantially free of image artifacts and/or that is scalable to a desired image resolution required by the application 50.

In the illustrated example, the client device 40 further includes a capability exchanger 78 and the server device 42 further includes a capability exchanger 80 to exchange information that indicates a capability of the client device 40 and the server device 42. In one example where a connection is to be established over a short-range wireless network (e.g., WiFi Direct, WLAN, WiGig, etc.), the server device 42 may not advertise a capability to the client device 40 to encode video via H.264 when the client device 40 includes an H.264 encoder. The client device 40 may also disregard a capability advertised by the server device 42 when the client device 40 has a superior capability, can process data more efficiently (e.g., when a server is no longer able to handle a media data, etc.), when the client device 40 follows a preference, and so on.

The client device 40 further includes a resource manager 82 to identify a resource of the server device 42. In the illustrated example, the resource manager 82 includes a descriptor identifier 84 to identify a descriptor corresponding to the server resource 62. For example, a MA-USB host stack at the client device 40 and a MA-USB hub stack at the server device 42 may be launched and/or notified (if running) when a wireless connection is established to provide USB capabilities and/or to exchange device descriptors via the interfaces 54, 56 (e.g., MA-USB interfaces, etc.). In this regard, there may be a different device driver with a corresponding device descriptor for each capability at the client device 40 and for each capability offered by the server device 42.

Accordingly, for example, the MA-USB hub stack may forward a device descriptor to the client device 40 that it determines may be of value to the client device 40 (e.g., based on capabilities exchanged, historical data, etc.). In one example, the capability exchanger 80 may indicate that the server device 42 offers a capability to encode via High Efficiency Video Encoding (HVEC) (e.g., H.264, H.265, etc.). Thus, the MA-USB hub stack at the server device 42 may provide a descriptor corresponding to the server resource 62 via the interface 56 that identifies an endpoint identifier (ID) and/or a device driver ID of an H.264 encoder, an H.265 encoder, etc.

The client device 40 further includes a registration manager 86 to register a resource at the client device 40. In one example, the MA-USB host stack receives a descriptor corresponding to the server resource 62 via the interface 54 and the registration manager 86 registers the server resource 62 with an operating system (OS) 88 at the client device 40. Registration of the server resource 62 may include adding the server resource 62 to a device manager, which may provide a list of resources that are available to the client device 40 with a description of the resource (e.g., a device descriptor, a corresponding device description such as vendor ID, device speed, supported resolution, etc.). Notably, a standard defined USB class for a resource (e.g., multimedia co-processor, etc.) may be added that allows for exposure of a resource as a USB device and/or a driver whether connected wireless through USB or a wired connection using a device manager, which may be accessed by an application, an OS, a user, and so on.

Accordingly, for example, a video encoder may be exposed as a driver (e.g., USB driver, etc.) with any or all capabilities (e.g., supported resolutions, levels it can encode at, etc.) via the resource manager 82. In another example, a co-processor may be exposed as a driver (e.g., USB driver, etc.) with any or all capabilities (e.g., facial recognition, etc.) via the resource manager 82. Thus, for example, the task determiner 48 may determine that a task is to be processed locally at the client device 40 and/or remotely off the client device 40 (e.g., based on content type, frames per second required, preference, available resources, connection availability, connection type, etc.), and the controller 52 operating in an OS framework and/or in an application framework may query a list, a device manager, etc., to select an appropriate local resource and/or an appropriate remote resource. In addition, the controller 52 may choose an appropriate interface at the client device 42 based on other factors such as interface type (e.g., use a wired connection when available, use a wireless connection when moving, etc.).

The controller 52 may, for example, operate in the application 50 and/or in the OS 88 to select and/or load an appropriate plug-in to handle a task when the application 50 wishes to perform a compute intensive operation using a standard application programming interface (API) framework offered by the OS 88. The controller 52 may, for example, select and/or load an OS-supplied plugin 92 to a generic driver 94 for a client resource 96 or a vendor-supplied plugin 98 to a vendor-specific driver 100 for the client resource 96. The controller 52 may, for example, select the OS-supplied plugin 92 and/or the vendor-supplied plugin 96 to handle a H.265 encoding task at the client resource 96. In this regard, the plugin may include an HEVC encoder plugin for the HEVC encoding task, which may load a driver to request a resource (e.g., remote processor, local processor, etc.) to complete an operation and return a result.

The controller 52 may also, for example, select an appropriate plugin to load a device driver that communicates with an MA-USB host stack to forward a task to the server device 42. In one example, the controller 52 may select and/or load the OS-supplied plugin 92 to the generic driver 94 to communicate with the MA-USB host stack to forward a task to the server device 42 via the interfaces 54, 56 (e.g., MA-USB interface, etc.). In another example, the controller 52 may select and/or load the vendor-supplied plugin 98 to the vendor-specific driver 100 to communicate with the MA-USB host stack to forward a task to the server device 42 via the interfaces 54, 56.

Thus, a resource may be exposed to the application 50 and/or to the OS 88 to select an appropriate plugin, driver, and/or resource to handle a task (e.g., based on a device descriptor, capability description, etc.). In one example, the application 50 may be unaware where processing occurs and may pass a task to the OS 88 when the OS 88 is to select a local resource and/or a remote resource, select a plugin, forward a task to a protocol stack, issue a task to a connection (e.g., an adapter, etc.), and so on. The application 50 may, however, be aware of where processing occurs by, for example, selecting a local resource and/or a remote resource, selecting a plugin, and so on.

The client device 40 further includes a notifier 102 to make a notification that the server device 42 is no longer able to handle a task (e.g., at minimum level of service, etc.). A notification may be based on, for example, a connection status, signal strength, bandwidth availability, bandwidth requirements, proximity, latency, media content type, resource availability, etc. In addition, a notification may be based on a periodic determination (e.g., a temporal cycle, etc.), a determination in response to an event (e.g., signal loss, movement of a device, etc.), a preference (e.g., a user command, etc.), etc. The notifier 102 may, for example, communicate with the connection manager 44 to determine that proximity between the client device 40 and the server device 42 is insufficient (e.g., connection drop, out of proximity, etc.) to maintain a stable connection.

The notifier 102 may send the notification to one or more components of the client device 40 such as, for example, the application 50, the interface 54, the OS 88, and so on. For example, the notifier 102 may send the notification to the application 50, the OS 88, and/or a user of the client device 40 to suspend processing at the server device 42, to shut down data processing at the server device 42, to re-route data processing to the client device 40, and so on. In one example, the notifier 102 may send the notification to the interface 54 to force the interface 54 (e.g., a network adapter, etc.) into a low power state. A low power state may include, for example, a suspend state, an off state, and so on. Thus, data may not be pushed/pulled through the interface 54 until a predetermined criterion is satisfied (e.g., proximity, signal strength, bandwidth, etc.).

In another example, the controller 52 may select an appropriate driver for the client resource 96 to provide a task to the client resource 96 when the server device 42 is no longer able to handle a task (e.g., network degrades, server occupied, server down, etc.). A switch to process data locally at the client device 40 may be seamless from a perspective of a user of the client device 40. In addition, processing at the client resource 94 may be permanent (e.g., permanent for a particular media task, etc.), may be temporary (e.g., until a stable connection is established, etc.), and so on.

In one example, the controller 52 may suspend processing of a task at the server device 42 until the server device 42 is able to handle the task (e.g., signal strength improved, pre-determined proximity met, etc.), wherein a switch to process data locally at the client device 40 may be seamless from a perspective of a user of the client device 40. The controller 52 may also, for example, switch processing to another server device seamlessly from the server device 42, from the client device 40, etc. The controller 52 may further, for example, instruct a driver to switch communication from the client resource 96 to a MA-USB host stack at the client device 40 to forward new tasks to the server device 42 via the interfaces 54, 56 when server device 42 is able to handle the task.

The notifier 102 may further send a notification that is to indicate rendered data is returned from a server device. For example, the client device 40 may enter a low power state while rendering occurs at the server device 42, wherein the server device 42 may interrupt the client device 40 periodically to provide the rendered data. In this regard, the notifier 102 may send a notification to one or more components of the client device 40 to notify that rendered data is to be returned. Moreover, power usage may be further reduced via a direct DMA channel between a network controller (e.g., adapter, etc.) and a storage controller (e.g., memory controller, etc., etc.) on the client device 40, as these controllers may deal with most of I/O processing without waking a processor.

While examples have provided various components of the client device 40 and/or the server device 42 for illustration purposes, it should be understood that one or more components of the client device 40 and/or the server device 42 may reside in the same and/or different physical and/or virtual locations, may be combined, omitted, bypassed, re-arranged, and/or be utilized in any order. Moreover, any or all components of the client device 40 and/or the server device 42 may be automatically implemented (e.g., without human intervention).

Figure 3:
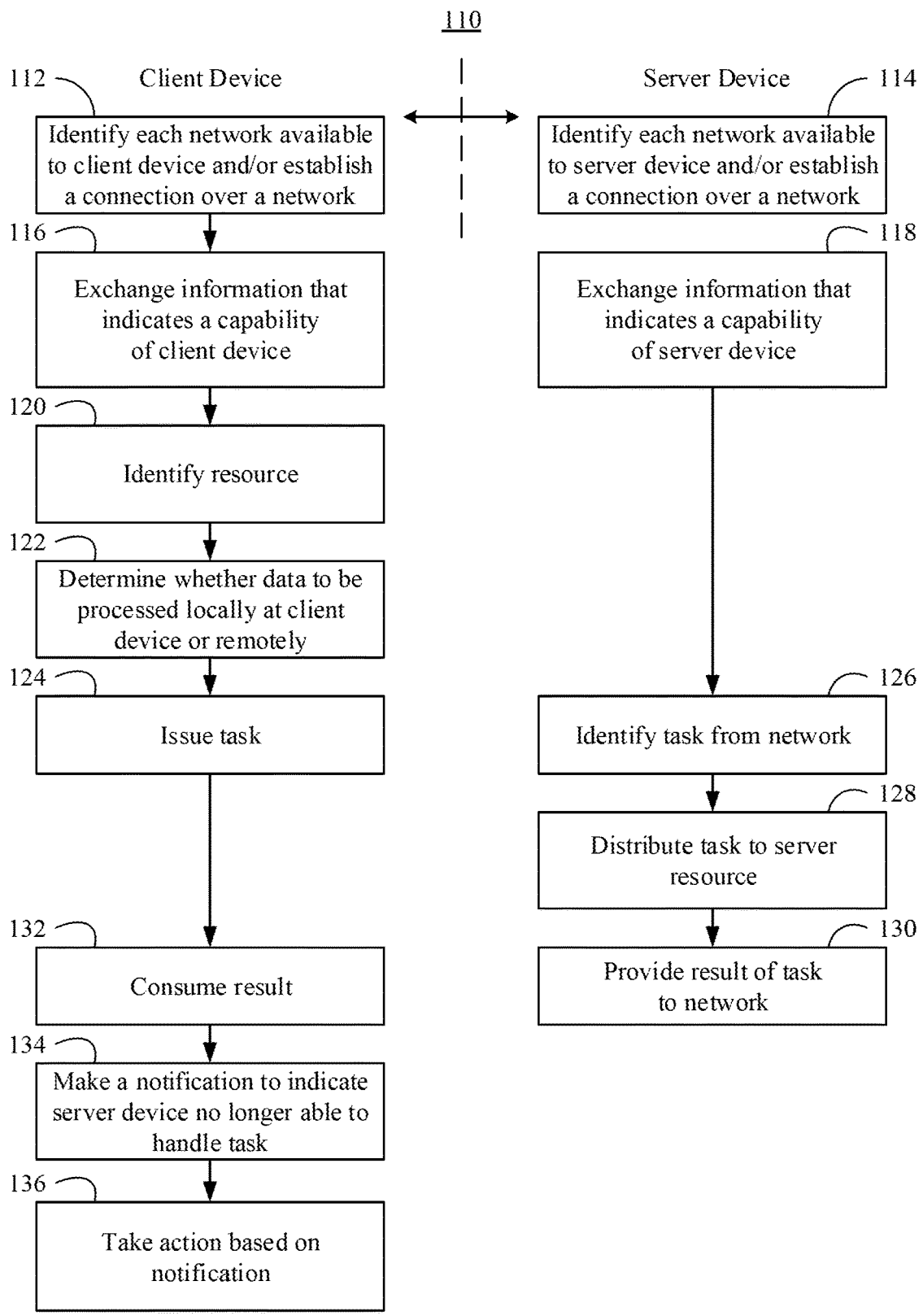
FIG. 3 is an illustration of an example of a method to provide data processing offload according to an embodiment.

Turning now to FIG. 3, a method 110 is shown to provide data processing offload according to an embodiment. The method 110 may be implemented via the system 10 (FIG. 1), already discussed, the client device 40 and/or the server device 42 (FIG. 2), already discussed, and so on. The method 110 may be implemented as a module or related component in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 110 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 112 provides for identifying each network available to a client device and/or establishing a connection over a network available to the client device. Similarly, processing block 114 provides for identifying each network available to a server device and/or establishing a connection over a network available to the server device. Blocks 112, 114 may determine proximity between a client device and a server device to establish a connection, determine signal strength of a wireless network between a client device and a server device to establish a connection, determine that a client device and a server device share a subnet to establish a connection, etc.

Illustrated processing block 116 provides for exchanging information that indicates a capability of a client device. Similarly, processing block 118 provides for exchanging information that indicates a capability of a server device. For example, blocks 116, 118 may exchange capabilities such as video encoding capabilities, frame buffer processing capabilities, pattern matching capabilities, pattern recognition capabilities, video editing capabilities, and so on. An exchange of capabilities may allow block 118 to become aware of how a server device may be of value to a client device. In addition, block 116 may disregard an advertisement from block 118 and/or block 118 may not advertise a capability to the client device when, for example, a client device has a superior capability, a client device can process data locally more efficiently, a client device follows a preference (e.g., preference for local processing based on content type, based on user settings, etc.), and so on.

Illustrated processing block 120 provides for identifying a resource. For example, block 120 may identify a descriptor corresponding to a server resource. In one example, block 120 may identify a descriptor from a MA-USB host stack at a client device that receives a descriptor. Block 120 may also register a server resource at a client device. Registration may include storing a resource that is available to a client device in a data repository such as memory, storage, a data structure (e.g., relational database, linked database, etc.), a device manager, and so on. Block 120 may further store a description of a resource, such as vendor ID, device speed, supported resolution, etc. Data in a repository may be used to expose a server resource to a client device.

Illustrated processing block 122 provides for determining whether a task is to be processed locally at a client device or remotely off the client device. For example, block 122 may determine where a task is to be process based on content type, frames per second required, preference (e.g., user preference, etc.), available resources, connection status/availability, connection type, and so on. Illustrated processing block 124 provides for issuing a task over a network. For example, block 124 may issue a task over a wireless network when the task is to be processed remotely off a client device, over a wired network when a task is to be processed remotely off a client device, to a local resource when a task is to be processed locally at a client device, and so on.

Block 124 may, for example, connect with a server device over a network and issue a task via a network interface (e.g., a wireless adapter, a wired adapter, etc.). For example, block 124 may connect to a server device over a network and issue a VGA over IP task via a wireless interface, a wired interface, and so on. Block 124 may, for example, implement a wireless universal serial bus (e.g., MA-USB, etc.) interface at a client device to exchange data (e.g., a task, a result, etc.) over a short-range wireless network, implement a cellular interface at a client device to exchange data over a cellular wireless network, implement a wired interface at a client device to provide data over a wired network (e.g., Ethernet network, fiber optic network, etc.), and so on.

Block 124 may also, for example, select a driver for a server resource to provide a task over a network interface when a server device is to handle a task. In one example, block 124 may select a plugin to a driver. For example, block 124 may select an HEVC encoder plugin to load a driver for an HEVC encoding task that communicates with a local MA-USB host protocol stack, which communicates remotely with a MA-USB hub protocol stack over a network to issue a request and to return a result of the request. Block 124 may also issue a task to a local resource of a client device when a task is to be processed locally on a client device. Block 124 may, for example, select an HEVC encoder plugin to load a driver for an HEVC encoding task that communicates with a client resource, directly and/or via a MA-USB host protocol stack. In addition, block 124 may schedule a client resource and/or may issue a task directly to a client resource. Thus, for example, block 124 may issue a VGA task directly to a graphics accelerator to obtain a result.

Illustrated processing block 126 provides for identifying a task from a wireless network and/or a wired network when a task is to be processed locally at a server device. Block 126 may, for example, identify a task from a MA-USB hub stack at a server device that receives a task. Block 126 may also, for example, retrieve a task from a data repository (e.g., memory, first-in-first-out queue, etc.) to provide a task to a server resource at a server device. Illustrated processing block 128 provides for distributing a task to a server resource at a server device.

Block 128 may, for example, schedule a server resource to handle a task, provide a task to a server resource to handle a task, and so on. In one example, block 126 may identify a VGA over IP task and block 128 may distribute the VGA over IP task to a server VGA. In this regard, a frame buffer may be generated and transferred to server memory (e.g., random access memory, etc.) in response to a VGA over IP task. In another example, a MA-USB hub stack may receive an HVEC encoding task and implement an HVEC encoder to handle an HVEC encoding task.

Block 128 may further associate a task that is received at a server device with a resource that processes that task. Block 128 may make an association using a data structure, using protocol data (e.g., header bits, etc.), etc. In one example, a table may be maintained at a server device that associates a particular task from a particular address (e.g., IP address, media access control address, a mobile identification number, etc.) with a particular resource that is to process the task. The table may, for example, be updated with an address to allow a server device to return a result to a correct client device.

Illustrated processing block 130 provides a result of a task to a wireless network and/or a wired network when the result is to be consumed remotely at a client device. Block 130 may, for example, forward a result of a task when the task is complete to minimize delay, to adhere to quality-of-service requirements, to provide latency-sensitive content when generated, and so on. Block 130 may compress a result based on, for example, bandwidth availability, network connection type, content type, and so on. Block 130 may implement, for example, hardware compression to minimize delay, etc. In addition, block 130 may encrypt a result (e.g., compressed result, raw result, etc.). Block 130 may implement, for example, hardware encryption to minimize delay, etc. Block 130 may further implement RDMA to allow an adapter (e.g., Ethernet adapter, etc.) to transfer data to and/or from server memory without requiring a processor (e.g., a CPU, etc.). In this regard, the end-to-end return time may be minimized while maximizing media data quality and/or security. Block 130 may also implement a wireless universal serial bus interface (e.g., MA-USB, etc.) at a server device to provide a result over a short-range wireless network, implement a cellular interface at a server device to provide a result over a cellular wireless network, and so on.

Illustrated processing block 132 provides for consuming a result. Block 132 may, for example, consume a frame buffer by posting the frame buffer from a server device to a local VGA frame buffer that is read to present the frame buffer at a display (e.g., HD display, VR display, etc.) coupled with a client device. A frame buffer may, for example, be placed into a relatively low-end graphic adapter that is substantially free of image artifacts and/or that is scalable to a desired image resolution required by an application. Block 132 may decompress a result and/or decrypt a result as needed.

Illustrated processing block 134 provides for making a notification to an application, an operating system, a user, and/or an interface at a client device to indicate that a server device is no longer able to handle a task. A notification may be based on, for example, a connection status, signal strength, bandwidth availability, bandwidth requirements, proximity, latency, media content type, resource availability, etc. In addition, a notification may be based on a periodic determination (e.g., a temporal cycle, etc.), a determination in response to an event (e.g., signal loss, movement of a device, etc.), a preference (e.g., a user command, etc.), etc.

Illustrated processing block 136 may take action based on a notification. For example, block 136 may communicate with block 124 to switch from remote processing of a present, ongoing, and/or new task to local processing of the present, ongoing, and/or new task. In one example, block 136 may communicate with block 124 to select a driver for a client resource to provide an ongoing task to a client resource when the server device is no longer able to handle the task. In another example, block 136 may communicate with block 124 to suspend processing of an ongoing task until a server device is able to handle the task. Processing switching between a client device and one or more server devices may be seamless from the viewpoint of a user.

While independent blocks and/or a particular order has been shown for illustration purposes, it should be understood that one or more of the blocks of the method 110 may be combined, omitted, bypassed, re-arranged, and/or flow in any order. Moreover, any or all blocks of the method 110 may be automatically implemented (e.g., without human intervention, etc.).

Figure 4:
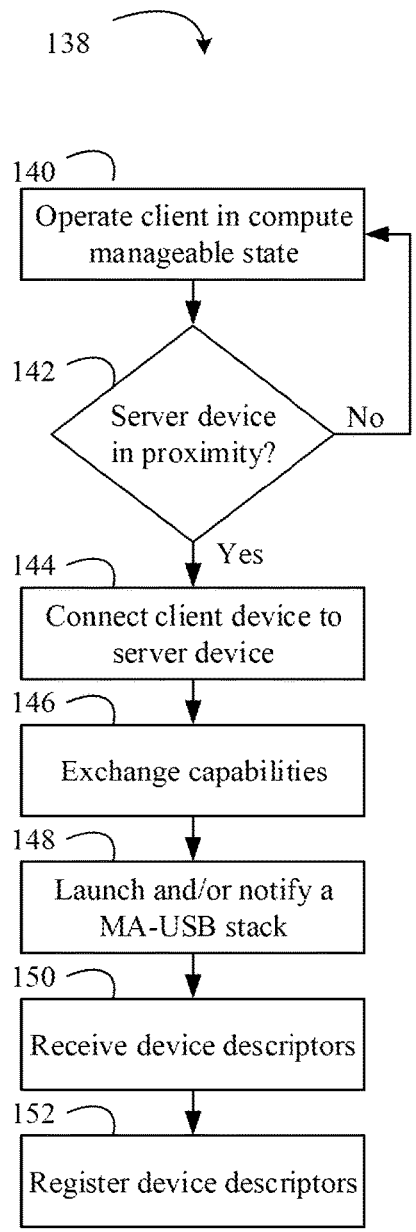
FIG. 4 is an illustration of an example of a method to initialize data processing offload using a short-range wireless connection according to an embodiment.

FIG. 4 shows a method 138 to initialize data processing offload using a short-range wireless connection according to an embodiment. The method 138 may be implemented via the system 10 (FIG. 1), already discussed, the client device 40 and/or the server device 42 (FIG. 2), already discussed, and so on. The method 138 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, and so on.

Illustrated processing block 140 provides for operating a client device in a compute manageable state. A compute manageable state may be determined based on a type of data to be generated and/or consumed, user settings (e.g., power consumption tolerance, processor utilization tolerance, etc.), and so on. For example, a client device in a compute manageable state may not consume processor cycle time for media data processing, may not consume a frame buffer, may not exceed a predetermined processor utilization threshold, and so on. A determination is made at block 142 whether there is a server device in proximity to the client device. If not, control returns to block 140 to operate the client device in a compute manageable state. If so, illustrated processing block 144 connects the client device to the server device and illustrated processing block 146 exchanges capabilities between the client device and the server device.

Illustrated processing block 148 launches and/or notifies (if running) an MA-USB host stack at the client device when a wireless connection is established to provide USB capabilities and/or to exchange device descriptors. Illustrated processing block 150 receives the device descriptors through the MA-USB host stack. In addition, illustrated processing block 152 registers the device descriptors and loads associated device drivers. In one example, block 152 notifies the OS to register the device descriptors via a device manager and loads device drivers corresponding to the received device descriptors to handle a task from an application at the client device.

While independent blocks and/or a particular order has been shown for illustration purposes, it should be understood that one or more of the blocks of the method 138 may be combined, omitted, bypassed, re-arranged, and/or flow in any order. Moreover, any or all blocks of the method 138 may be automatically implemented (e.g., without human intervention, etc.).

Figure 5:
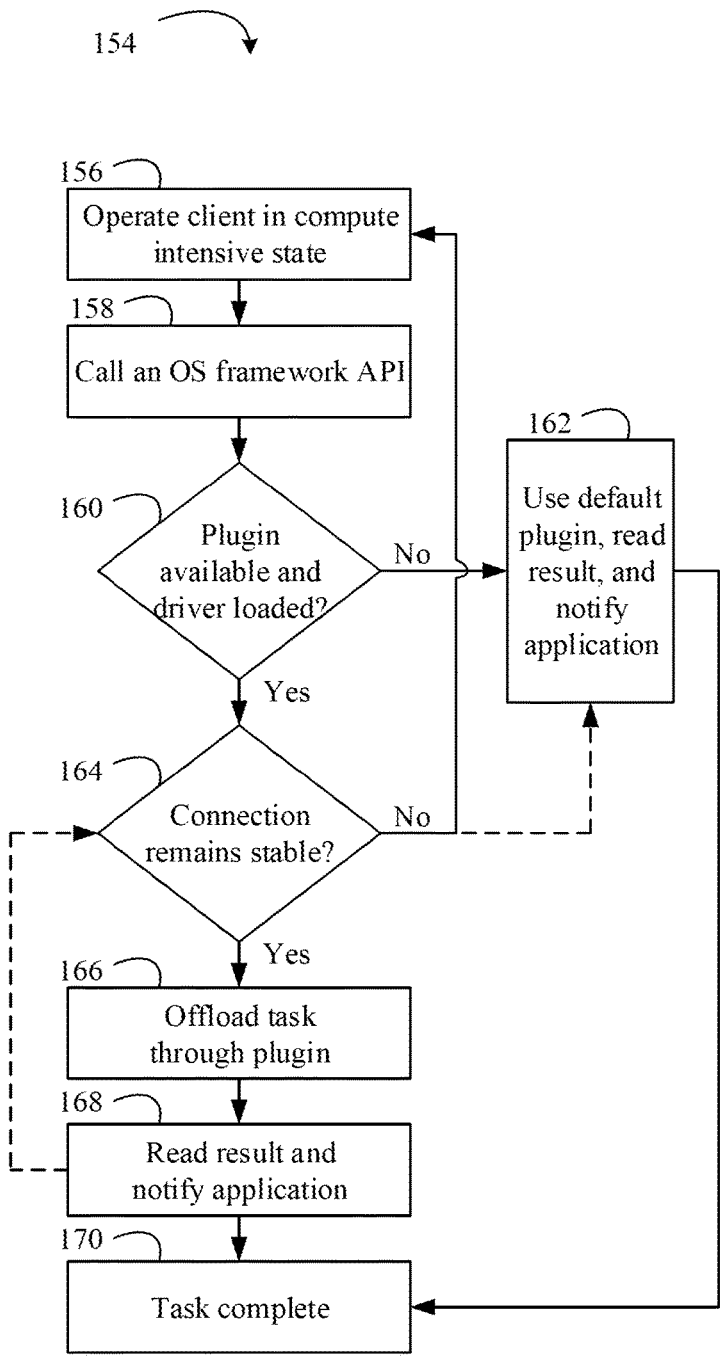
FIG. 5 is an illustration of an example of a method to provide data processing offload using a short-range wireless connection according to an embodiment.

Turning now to FIG. 5, a method 154 is shown to provide data processing offload over a short-range wireless connection according to an embodiment. The method 154 may be implemented via the system 10 (FIG. 1), already discussed, the client device 40 and/or the server device 42 (FIG. 2), already discussed, and so on. The method 154 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, and so on.

Illustrated processing block 156 provides for operating a client device in a compute intensive state. For example, a client device may consume processor cycle time for media data processing, a frame buffer, etc. Block 156 may, for example, identify that an application capable of issuing a task to start a compute intensive task is launched, is called, is loaded, begins to issue tasks, and so on. Illustrated processing block 158 calls an OS framework API to perform a compute intensive task (e.g., create a frame buffer, etc.). A determination is made at block 160 whether a plugin is available to offload the task and whether a driver associated with the plugin is loaded. If not, illustrated processing block 162 implements a default plugin, reads a result of the task, and notifies the application. In this regard, the application and/or the OS may choose to suspend processing, modify local resource allocation to handle the task, continue processing with the understanding that performance may be effected, and so on.

If a plugin is available to offload a task and a driver associated with the plugin is loaded, then a determination is made at block 164 whether a connection with a server device remains stable. If not, block 164 notifies the application and control may return to block 162. If so, illustrated processing block 166 offloads the task through the plugin. Illustrated processing block 168 reads a result of processing the task and notifies the application. Also, block 164 may again determine whether a connection with a server device remains stable. The compute intensive task is complete at processing block 170.

While independent blocks and/or a particular order has been shown for illustration purposes, it should be understood that one or more of the blocks of the method 154 may be combined, omitted, bypassed, re-arranged, and/or flow in any order. Moreover, any or all blocks of the method 154 may be automatically implemented (e.g., without human intervention, etc.).

Figure 6:
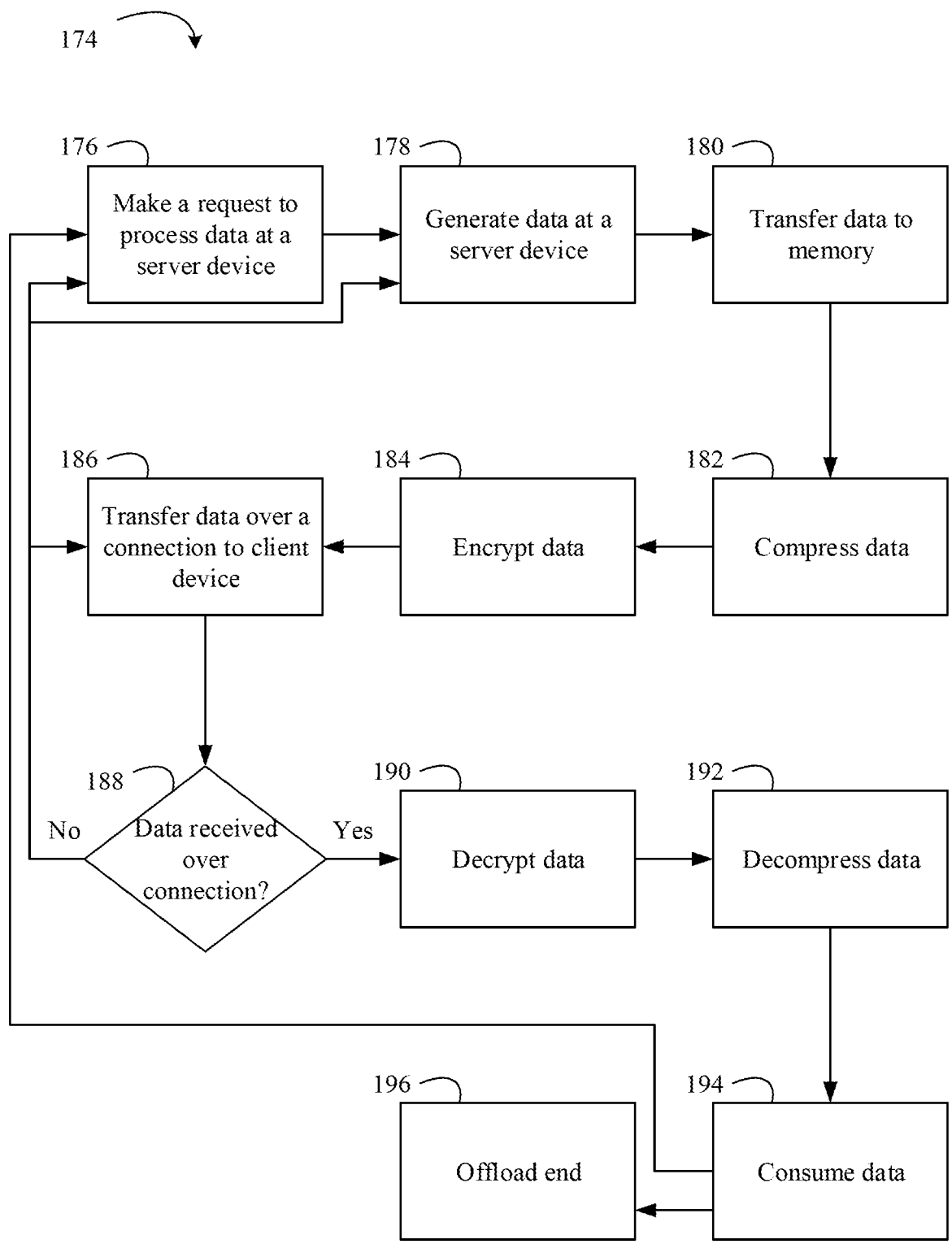
FIG. 6 is an illustration of an example of a method to provide data processing offload using a cellular connection and/or a wired connection according to an embodiment.

FIG. 6 shows a method 174 to provide data processing offload using a cellular connection and/or a wired connection according to an embodiment. The method 174 may be implemented via the system 10 (FIG. 1), already discussed, the client device 40 and/or the server device 42 (FIG. 2), already discussed, and so on. The method 174 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, and so on.

Illustrated processing block 176 provides for making a request to process data at a server device. In one example, block 176 may connect with a server device and request VGA over IP acceleration. Illustrated processing block 178 provides for generating data in response to a request. For example, block 178 may generate a frame buffer in response to the VGA over IP acceleration request. Illustrated processing block 180 provides for transferring data to memory (e.g., random access memory, etc.). Illustrated processing block 182 provides for compressing data. For example, block 182 may compress the frame buffer using lossless compression (e.g., LZW compression, hardware compression, etc.). Illustrated processing block 184 provides for encrypting data. For example, block 184 may encrypt the frame buffer (e.g., compressed frame buffer, etc.) using block-cipher compression (e.g., AES-NI, hardware encryption, etc.).

Illustrated processing block 186 provides for transferring data over a connection. In one example, block 186 may transfer the frame buffer from memory to a client device using RDMA over Ethernet. In another example, block 186 may transfer the frame buffer from memory to a client device using a MA-USB stack over a short-range wireless network, using a cellular stack over a cellular network, and so on. For example, block 186 may determine that the data corresponds to relatively high-bandwidth data (e.g., 4K data, etc.) and that a wired connection is available to transfer the data over a wired connection (e.g., Ethernet network, etc.). Block 186 may also, for example, determine that the data corresponds to relatively low-bandwidth data (e.g., map image data, etc.) and that a wireless connection is available to transfer the data over a wireless connection (e.g., 4G cellular network, etc.).

A determination may be made at block 188 whether data is received over a connection. If not, block 178 may again make the request to process data. In addition, block 180 may again generate data. Also, block 186 may again transfer data over a connection to the client device. In one example, block 178, block 180, and/or block 186 may implement respective operations when a predetermined time period is exceeded. For example, a predetermined time period may account for end-to-end delay over a connection between a client device and a server device, processing time, and so on.

If data is received over a connection, illustrated processing block 190 provides for decrypting data. For example, block 190 may decrypt the frame buffer using block-cipher decompression (e.g., reverse of AES-NI, hardware decryption, etc.). Illustrated processing block 192 provides for decompressing data. For example, block 192 may decompress the frame buffer using the reverse of LZW compression, hardware decompression, and so on. Illustrated processing block 194 provides for consuming data. Block 194 may, for example, post the frame buffer to a local VGA frame buffer and display the frame buffer using a display device. Control returns to block 176 to process next data, such as a next frame buffer. Otherwise, process offloading ends at illustrated processing block 196.

While independent blocks and/or a particular order has been shown for illustration purposes, it should be understood that one or more of the blocks of the method 174 may be combined, omitted, bypassed, re-arranged, and/or flow in any order. Moreover, any or all blocks of the method 174 may be automatically implemented (e.g., without human intervention, etc.).

Figure 7:
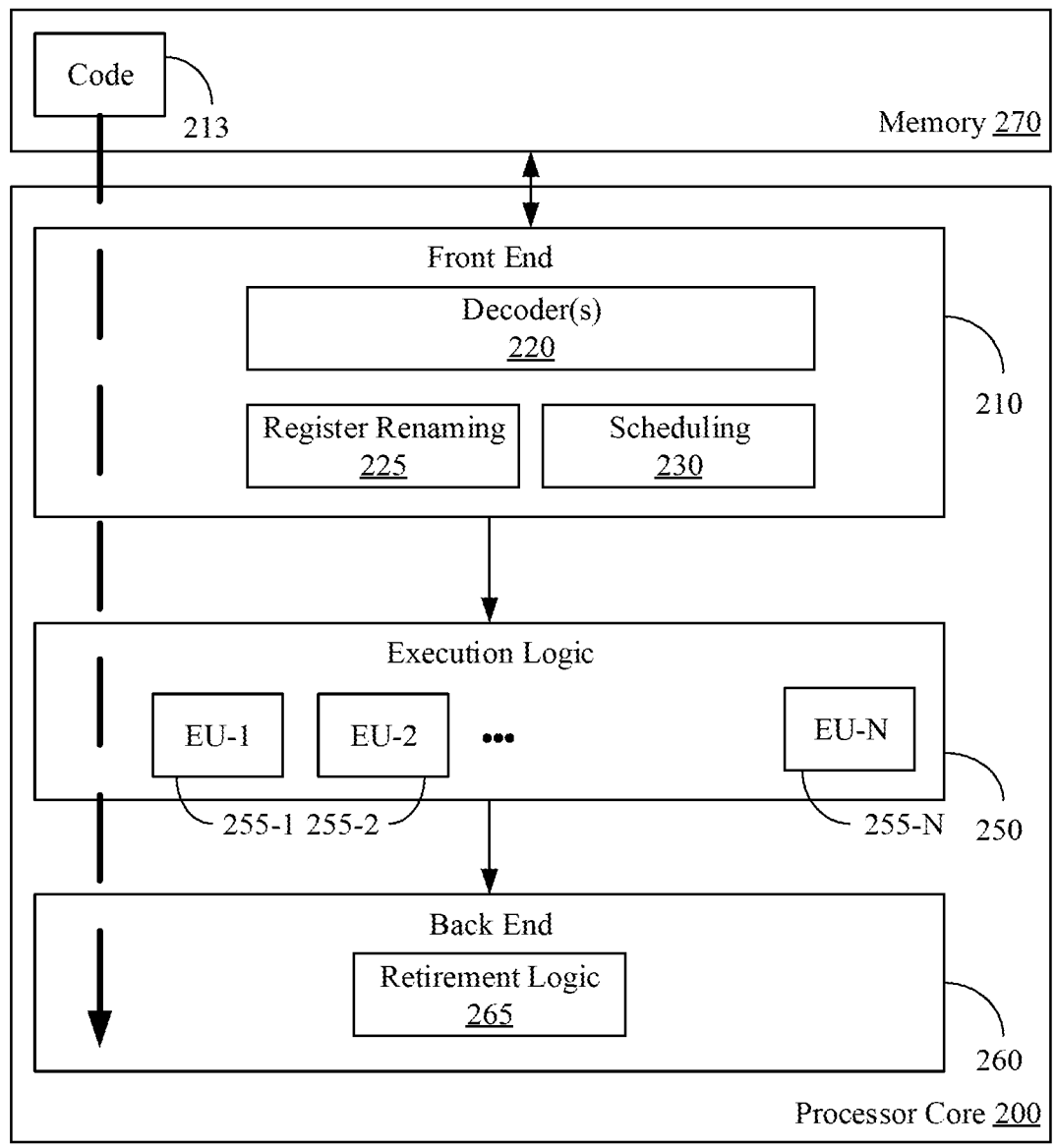
FIG. 7 is a block diagram of an example of a processor according to an embodiment.

FIG. 7 shows a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 7, a processing element may alternatively include more than one of the processor core 200 illustrated in FIG. 7. The processor core 200 may be a single-threaded core or, for at least one embodiment, the processor core 200 may be multithreaded in that it may include more than one hardware thread context (or "logical processor") per core.

FIG. 7 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the system 10 (FIG. 1), the client device 40 and/or the service device 42 (FIG. 2), the method 110 (FIG. 3), the method 138 (FIG. 4), the method 154 (FIG. 5), and/or the method 174 (FIG. 6), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 7, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 8, shown is a block diagram of a computing system 1000 embodiment in accordance with an embodiment. Shown in FIG. 8 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 8 may be implemented as a multi-drop bus rather than point-to-point interconnect.

As shown in FIG. 8, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 7.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 8, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 5, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 8, various I/O devices 1014 (e.g., cameras, sensors, etc.) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026 (which may in turn be in communication with a computer network), a display 1013 (e.g., touch screen), and a data storage unit 1019 such as a disk drive or other mass storage device which may include code 1030, in one embodiment. The illustrated code 1030 may implement the system 10 (FIG. 1), the client device 40 and/or the service device 42 (FIG. 2), the method 110 (FIG. 3), the method 138 (FIG. 4), the method 154 (FIG. 5), and/or the method 174 (FIG. 6), already discussed. Further, an audio I/O 1024 may be coupled to second bus 1020 and a battery 1010 may supply power to the computing system 1000.

Note that other embodiments are contemplated. For example, instead of the point-to-point architecture of FIG. 8, a system may implement a multi-drop bus or another such communication topology. Also, the elements of FIG. 8 may alternatively be partitioned using more or fewer integrated chips than shown in FIG. 8.

Additional Notes and Examples

Example 1 may include a system to provide data processing offload comprising a client device including, a task determiner to determine whether a task is to be processed locally at the client device or remotely off the client device, and a controller to issue the task to one of a wireless network or a wired network when the task is to be processed remotely off the client device, and a server device including, a task identifier to identify the task from one of the wireless network or the wired network when the task is to be processed locally at the server device, and a task distributer to, distribute the task to a server resource at the server device when the task is to be to processed locally at the service device, and provide a result of the task to the wireless network or the wired network when the result is to be consumed remotely at the client device.

Example 2 may include the system of Example 1, further including a first wireless universal serial bus interface at the client device, and a second wireless universal serial bus interface at the server device, wherein the result is to include media data that is to be exchanged over a short-range wireless network.

Example 3 may include the system of any one of Examples 1 to 2, further including a cellular interface at the client device to receive media data over a cellular wireless network, and a remote direct memory access interface at the server device to provide media data over an Ethernet network.

Example 4 may include an apparatus to provide data processing offload comprising a task determiner to determine whether a task is to be processed locally at a client device or remotely off the client device, and a controller to issue the task to one of a wireless network or a wired network when the task is to be processed remotely off the client device at a server device.

Example 5 may include the apparatus of Example 4, further including a connection manager to one or more of, identify each network available to the client device, or establish a connection over one or more networks available to the client device.

Example 6 may include the apparatus of any one of Examples 4 to 5, further including one or more of, a capability exchanger to exchange information that is to indicate a capability of the client device and a capability of the server device, and a resource manager including one or more of, a descriptor identifier to identify a descriptor corresponding to a server resource, or a registration manager to register the server resource, wherein registration is to add the server resource to a device manager that is to be used to expose the server resource to one or more of an application or an operating system at the client device.

Example 7 may include the apparatus of any one of Examples 4 to 6, further including a notifier to make a notification to one or more of an application, an operating system, or an interface at the client device to indicate that the server device is no longer able to handle the task.

Example 8 may include the apparatus of any one of Examples 4 to 7, wherein the controller is to one or more of, select a driver for a client resource to provide the task to the client resource when the server device is no longer able to handle the task, or suspend processing of the task until the server device is able to handle the task.

Example 9 may include the apparatus of any one of Examples 4 to 8, further including one or more of, a data decompressor to decompress a result of the task, a data decryptor to decrypt the result, or a data consumer to consume the result, wherein the data consumer is to include a frame buffer consumer that is to consume a frame buffer.

Example 10 may include the apparatus of any one of Examples 4 to 9, further including one or more of, a wireless universal serial bus interface at the client device to receive media data over a short-range wireless network, a cellular interface at the client device to receive media data over a cellular wireless network, or a wired interface at the client device to receive media data over an Ethernet network.

Example 11 may include an apparatus to provide data processing offload comprising a task identifier to identify a task from one of a wireless network or a wired network when the task is to be processed locally at a server device, and a task distributer to, distribute the task to a server resource at the server device when the task is to be processed locally at the service device, and provide a result of the task to the wireless network or the wired network when the result is to be consumed remotely at a client device.

Example 12 may include the apparatus of Example 11, further including one or more of, a data compressor to compress the result, wherein the data compressor is to include a hardware data compressor, or a data encryptor to encrypt the result, wherein the data encryptor is to include a hardware data encryptor.

Example 13 may include the apparatus of any one of Examples 11 to 12, further including a data generator to generate the result, wherein data generator is to include a frame buffer generator that is to generate a frame buffer to be consumed by the client device.

Example 14 may include the apparatus of any one of Examples 11 to 13, further including one or more of, a wireless universal serial bus interface at the server device to provide media data over a short-range wireless network, a cellular interface at the server device to provide media data over a cellular wireless network, or a remote direct memory access interface at the server device to provide media data over an Ethernet network.

Example 15 may include at least one non-transitory computer readable storage medium comprising a set of instructions, which when executed by a processor, cause the processor to determine whether a task is to be processed locally at a client device or remotely off the client device, and issue the task to one of a wireless network or a wired network when the task is to be processed remotely off the client device at a server device.

Example 16 may include the at least one non-transitory computer readable storage medium of Example 15, wherein the instructions, when executed, cause the processor to one or more of, identify each network available to the client device, or establish a connection over one or more networks available to the client device.

Example 17 may include the at least one non-transitory computer readable storage medium of any one of Examples 15 to 16, wherein the instructions, when executed, cause the processor to one or more of, exchange information that is to indicate a capability of the client device and a capability of the server device, identify a descriptor corresponding to a server resource, or register the server resource, wherein registration is to add the server resource to a device manager that is to be used to expose the server resource to one or more of an application or an operating system at the client device.

Example 18 may include the at least one non-transitory computer readable storage medium of any one of Examples 15 to 17, wherein the instructions, when executed, cause the processor to make a notification to one or more of an application, an operating system, or an interface at the client device to indicate that the server device is no longer able to handle the task.

Example 19 may include the at least one non-transitory computer readable storage medium of any one of Examples 15 to 18, wherein the instructions, when executed, cause the processor to one or more of, select a driver for a client resource to provide the task to the client resource when the server device is no longer able to handle the task, or suspend processing of the task until the server device is able to handle the task.

Example 20 may include the at least one non-transitory computer readable storage medium of any one of Examples 15 to 19, wherein the instructions, when executed, cause the processor to one or more of, decompress a result of the task, decrypt the result, or consume the result, wherein the result is to include a frame buffer.

Example 21 may include the at least one non-transitory computer readable storage medium of any one of Examples 15 to 20, wherein the instructions, when executed, cause the processor to one or more of, implement a wireless universal serial bus interface at the client device to receive media data over a short-range wireless network, implement a cellular interface at the client device to receive media data over a cellular wireless network, or implement a wired interface at the client device to receive media data over an Ethernet network.

Example 22 may include at least one non-transitory computer readable storage medium comprising a set of instructions, which when executed by a processor, cause the processor to identify a task from one of a wireless network or a wired network when the task is to be processed locally at a server device, distribute the task to a server resource at the server device when the task is to be to processed locally at the service device, and provide a result of the task to the wireless network or the wired network when the result is to be consumed remotely at a client device.

Example 23 may include the at least one non-transitory computer readable storage medium of Example 22, wherein the instructions, when executed, cause the processor to one or more of, implement a hardware compression to compress the result, or implement a hardware encryption to encrypt the result.

Example 24 may include the at least one non-transitory computer readable storage medium of any one of Examples 22 to 23, wherein the instructions, when executed, cause the processor to generate the result, wherein the result is to include a frame buffer to be consumed by the client device.

Example 25 may include the at least one non-transitory computer readable storage medium of any one of Examples 22 to 24, wherein the instructions, when executed, cause the processor to one or more of, implement a wireless universal serial bus interface at the server device to provide media data over a short-range wireless network, implement a cellular interface at the server device to provide media data over a cellular wireless network, or implement a remote direct memory access interface at the server device to provide media data over an Ethernet network.

Example 26 may include a method to provide data processing offload comprising, determining whether a task is to be processed locally at a client device or remotely off the client device, and issuing the task to one of a wireless network or a wired network when the task is to be processed remotely off the client device at a server device.

Example 27 may include the method of Example 25, further including one or more of, identifying each network available to the client device, or establishing a connection over one or more networks available to the client device.

Example 28 may include the method of any one of Examples 25 to 27, further including one or more of, exchanging information that indicates a capability of the client device and a capability of the server device, identifying a descriptor corresponding to a server resource, or registering the server resource, wherein registration adds the server resource to a device manager that is used to expose the server resource to one or more of an application or an operating system at the client device.

Example 29 may include the method of any one of Examples 25 to 28, further including making a notification to one or more of an application, an operating system, or an interface at the client device to indicate that the server device is no longer able to handle the task.

Example 30 may include the method of any one of Examples 25 to 29, further including one or more of, selecting a driver for a client resource to provide the task to the client resource when the server device is no longer able to handle the task, or suspending processing of the task until the server device is able to handle the task.

Example 31 may include the method of any one of Examples 25 to 30, further including one or more of, decompressing a result of the task, decrypting the result, or consuming the result, wherein the result includes a frame buffer.

Example 32 may include the method of any one of Examples 25 to 31, further including one or more of, implementing a wireless universal serial bus interface at the client device to receive media data over a short-range wireless network, implementing a cellular interface at the client device to receive media data over a cellular wireless network, or implementing a wired interface at the client device to receive media data over an Ethernet network.

Example 33 may include a method to provide data processing offload comprising, identifying a task from one of a wireless network or a wired network when the task is to be processed locally at a server device, distributing the task to a server resource at the server device when the task is to be to processed locally at the service device, and providing a result of the task to the wireless network or the wired network when the result is to be consumed remotely at a client device.

Example 34 may include the method of Example 33, further including one or more of, implementing hardware compression to compress the result, or implementing hardware encryption to encrypt the result.

Example 35 may include the method of any one of Examples 33 to 34, further including generating the result, wherein the result includes a frame buffer to be consumed by the client device.

Example 36 may include the method of any one of Examples 33 to 35, further including one or more of, implementing a wireless universal serial bus interface at the server device to provide media data over a short-range wireless network, implementing a cellular interface at the server device to provide media data over a cellular wireless network, or implementing a remote direct memory access interface at the server device to provide media data over an Ethernet network.

Example 37 may include an apparatus to a provide data processing offload comprising means for performing the method of any one of Examples 26 to 32.

Example 38 may include an apparatus to a provide data processing offload comprising means for performing the method of any one of Examples 33 to 36.

Thus, techniques described herein provide for offloading data processing. For example, a relatively low power device may seamlessly offload its multimedia computing wirelessly when a relatively powerful and/or power-connected device (e.g., NUC, All-In-One PC, etc.) is in range. In one example, a result is received and consumed seamlessly and/or without an impact to user experience (e.g., not visible to a user, etc.). Accordingly, battery life may be maximized and/or additional capabilities may be exposed that are not a part of the relatively low power device.

Embodiments may include a power-connected device (e.g., Hub) that exposes a capability to a low-power device (e.g., Host) wirelessly (through MA-USB etc.) as, for example, a USB device that offers a co-processing service. The low-power device may offer support in its OS framework to allow one or more applications to use the co-processor device's capability. The OS may choose to use the co-processor directly without involving an application. In addition, two or more devices may exchange capabilities out-of-band in advance. Moreover, a power-connected device may decide what capabilities to expose (e.g., if a low-power device already has an efficient H.264 encoder, it does not have to be exposed from a remote device). Also, a host OS may inform an application through callback notifications that there may be a change in quality of service being provided (if applicable) when devices go out of range.

A user may have flexibility to use the low-power device (e.g., mobile device, etc.) wherever the user desires inside an area (e.g., a house, etc.) and may be able to work on intensive compute tasks such as multimedia processing, wherein the user may use the same application the user is comfortable with on the low-power device. The presence of the power-connected device in the area may perform any or all of the intensive compute tasks without a user's knowledge to save battery life of the low-power device. Additionally, embodiments may enhance the capabilities of the low-power device. For example, any or all compute options present in the power-connected device may be exposed to the low-power device (e.g., a hardware encoder for HEVC format, etc.).

In one example, a user may have a front camera on a mobile device that may capture an image of the user, but the mobile device may not be powerful enough to analyze the image in depth, to capture a gesture, to recognize a face, and so on. While in the vicinity of a NUC device (e.g., inside a home and connected to a common home router, etc.), the camera feed could be offloaded to the NUC seamlessly to allow the NUC to classify a face, a gesture, etc., and the mobile device may use the result. In another example, a user may run a video editing application and start a rendering operation that may that may take hours to complete. The battery on the device may not be sufficient for the compute intensive task. Accordingly, input data may be sent to a PC at home to allow the mobile device to enter a low power state while rendering occurs on the PC. The PC may interrupt the mobile device periodically to provide the rendered data. Moreover, power usage may be reduced further via a direct DMA channel between a network controller and a storage controller on the mobile device, as these controllers may accommodate most of the I/O operations without waking the CPU.

Embodiment may provide for establishing a connection between the low-power device and the power-connected device (e.g., a more powerful device, etc.) in wireless proximity. The devices may exchange capabilities about one another, to allow one or more power-connected devices to know where they may be of value to the low-power device. For example, the low-power device may have an efficient encoder for H.264, and one power-connected device may skip advertising that capability. Once a connection is established, the devices may launch (or notify a running) MA-USB stack, which provides USB capabilities over a wireless network. In one example, the MA-USB stack on the power-connected device may send device descriptors it believes may be of value to the low-power device (e.g., based on capabilities exchanged, etc.). The low-power device may register the device based on, for example, the device descriptors.

In one example, an application on the low-power device may wish to perform an intensive compute operation using a standard API framework offered by the low-power device OS, wherein the OS chooses to load an appropriate plugin for a task. For example, a HEVC encoding task may use a HEVC encoder plugin, which may be either an OS-supplied plugin or a vendor-supplied plugin. The vendor plugin may, for example, load a vendor driver that communicates with the MA-USB stack to request the remote processor complete the operation and return a result. The OS may perform the same operation through a generic driver it supplies that makes a decision to use either its local processing capabilities or the remote processor through the MA-USB stack.

When devices move out of wireless range and/or network lag outweighs the power and/or performance benefits of offload, a shutdown/suspend sequence may be triggered that in turn may result in a notification to the MA-USB stack, which notifies the OS framework through the driver. While the OS framework may handle this gracefully by switching to a fallback plugin to replace a lost one and continue operation seamlessly, the OS framework may send a notification through an API to an application to notify the application that there may to a change in power and/or performance. For example, a vendor plugin may offer an encoding service at 60 frames per second (fps), while a generic plugin that uses local hardware may be capable of 30 fps. In this regard, the application may be aware and decide whether or not to continue the operation.

In addition, standardization may be implemented to provide more interoperability between different OSes and different manufacturers. For example, there may not be a 'coprocessor device class' defined in USB. A device may be added and an OS may add support for the device class natively, wherein a co-processor hardware (or software on a remote OS) manufacturer may augment a different vendor's host device. In one example, a 'co-processor device added (or removed)' notification on a system tray or in a device manager menu may be provided while a host device is in the vicinity of a remote device that offers this class of service.

Embodiments may also move rendering tasks to a cloud computing network, or a cloud edge (fog), and transmit ready to use frame buffers to thin-client compute devices. Hardware components, such as RDMA and high-speed components (such as ASICs (e.g., compression, AES-NI cryptography, etc.), may provide transmission, compression, and/or cryptography to perform low latency and low system load remote displays for gaming, high performance graphics, medical imaging, etc. For example, embodiments may offload rendering of frame buffers to a high performance workstation/server and use of an Ethernet fabric, and/or 4G/5G networks, to transmit the frame buffers to low power, low performance clients (e.g., thin-clients, cell phones, in-vehicle infotainment systems, etc.) using hardware components (e.g., Ethernet with RDMA, hardware compression, AES-NI cryptography, etc.) that compress/decompress, cipher, and/or transmit/receive frame buffers for low latency communications.

In one example, system components may use high performance graphic acceleration cards to render frame buffers to specific host memory. In addition, ready to use hardware acceleration may facilitate compression, ciphering, and forwarding frame buffers to remote locations using, e.g., an Ethernet fabric. On the client side, a received frame buffer may be decompressed, decrypted, and/or placed into a frame buffer of low-end graphic adapter. Image artifacts may be minimized and relatively high image quality at any resolution demanded may be provided. Hardware components may, for example, substantially reduce latency in processing secure images. Additionally, lossless compression may minimize image artifacts. Thus, offload may be used for high quality medical imaging and/or for cloud graphic workstation solutions.

Moreover, clients may better use their computing power and merge many workstations into one cloud-based solution. Embodiments may centralize workstation tasks into one datacenter instead of spreading it over an office space. Embodiments may further provide low latency and secure, edge video processing/communication network in the FOG. A meshed edge network may relatively quickly share data across the entire mesh to ensure low latency fog communications. In addition, offload of processing to the edge itself may be accomplished utilizing platform features (e.g., FPGA, QAT, etc.) and pushed through a 4G/5G network to mobile devices (e.g., cars, cell phones, etc.).

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" or "at least one of" may mean any combination of the listed terms. For example, the phrases "one or more of A, B or C" may mean A; B; C; A and B; A and C; B and C; or A, B and C. In addition, a list of items joined by the term "and so on" or "etc." may mean any combination of the listed terms as well any combination with other terms.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising:
a client device to be powered by a battery including a processor and software modules including
a task determiner module to determine whether a task is to be processed locally at the client device or remotely off the client device, and
a controller module to issue the task to one of a wireless network or a wired network when the task is to be processed remotely off the client device, and
a server device to be powered by an alternating power source and located within distance of a short-range wireless network to the client device, the server device including a processor and software modules including:
a task identifier module to identify the task from one of the wireless network or the wired network when the task is to be processed locally at the server device, and
a task distributer module to,
distribute the task to a server resource at the server device when the task is to be processed locally at the server device,
provide a result of the task to the wireless network or the wired network when the result is to be consumed remotely at the client device; and
a first wireless universal serial bus interface at the client device, and
a second wireless universal serial bus interface at the server device, wherein the result is to include media data that is to be exchanged over the short-range wireless network.

2. The system of claim 1, further including,
a cellular interface at the client device to receive media data over a cellular wireless network, and
a remote direct memory access interface at the server device to provide media data over an Ethernet network.

3. The system of claim 1 wherein the battery powered client device comprises any of a laptop, a personal digital assistant (PDA), a mobile Internet device (MID), a vehicle infotainment system, a wireless smart phone, a smart tablet, a phablet, a smart TV, a smart watch, smart glasses or a mobile gaming platform.

4. The system of claim 1 wherein the alternating current powered server device comprises any of a workstation, a Next Unit of Computing (NUC) device, an All-In-One Personal Computer, a media content player, a set-top box, a media drive, or a gaming platform.

5. A system comprising:
a client device to be powered by a battery including a processor and software modules including:
means for determining whether a task is to be processed locally at the client device or remotely off the client device, and
means for issuing the task to one of a wireless network or a wired network when the task is to be processed remotely off the client device, and
a server device to be powered by an alternating power source and located within distance of a short-range wireless network to the client device, the server device including a processor and software modules including:
means for identifying the task from one of the wireless network or the wired network when the task is to be processed locally at the server device, and
means for distributing the task to a server resource at the server device when the task is to be processed locally at the server device and providing a result of the task to the wireless network or the wired network when the result is to be consumed remotely at the client device; and a first wireless universal serial bus interface at the client device, and a second wireless universal serial bus interface at the server device, wherein the result is to include media data that is to be exchanged over the short-range wireless network.

6. The system of claim 5, further including, a cellular interface at the client device to receive media data over a cellular wireless network, and a remote direct memory access interface at the server device to provide media data over an Ethernet network.

7. The system of claim 5, wherein the battery powered client device comprises any of a laptop, a personal digital assistant (PDA), a mobile Internet device (MID), a vehicle infotainment system, a wireless smart phone, a smart tablet, a phablet, a smart TV, a smart watch, smart glasses or a mobile gaming platform.

8. The system of claim 5, wherein the alternating current powered server device comprises any of a workstation, a Next Unit of Computing (NUC) device, an All-In-One Personal Computer, a media content player, a set-top box, a media drive, or a gaming platform.

9. At least one non-transitory computer readable storage medium comprising a set of instructions, which when executed by one or more processors, cause the one or more processors to:

at client device to be powered by a battery:
  determine whether a task is to be processed locally at the client device or remotely off the client device, and
  issue the task to one of a wireless network or a wired network when the task is to be processed remotely off the client device, and at a server device to be powered by an alternating power source and located within distance of a short-range wireless network to the client device to:
  identify the task from one of the wireless network or the wired network when the task is to be processed locally at the server device; and
  distribute the task to a server resource at the server device when the task is to be processed locally at the server device and providing a result of the task to the wireless network or the wired network when the result is to be consumed remotely at the client device; and control a first wireless universal serial bus interface at the client device, and control a second wireless universal serial bus interface at the server device, wherein the result is to include media data that is to be exchanged over the short-range wireless network.

10. The at least one non-transitory computer readable storage medium of claim 9, further to:

control a cellular interface at the client device to receive media data over a cellular wireless network, and control a remote direct memory access interface at the server device to provide media data over an Ethernet network.

11. The at least one non-transitory computer readable storage medium of claim 9 wherein the battery powered client device comprises any of a laptop, a personal digital assistant (PDA), a mobile Internet device (MID), a vehicle infotainment system, a wireless smart phone, a smart tablet, a phablet, a smart TV, a smart watch, smart glasses or a mobile gaming platform.

12. The at least one non-transitory computer readable storage medium of claim 9 wherein the alternating current powered server device comprises any of a workstation, a Next Unit of Computing (NUC) device, an All-In-One Personal Computer, a media content player, a set-top box, a media drive, or a gaming platform.

* * * * *